United States Patent [19]

Degnan et al.

[11] Patent Number: 5,378,352
[45] Date of Patent: Jan. 3, 1995

[54] HYDROCARBON UPGRADING PROCESS

[75] Inventors: Thomas F. Degnan, Morrestown; Stuart S. Shih, Cherry Hill, both of N.J.

[73] Assignee: Mobil Oil Corporation, Fairfax, Va.

[21] Appl. No.: 117,276

[22] Filed: Sep. 7, 1993

Related U.S. Application Data

[63] Continuation-in-part of Ser. No. 794,273, Nov. 19, 1991, abandoned.

[51] Int. Cl.$^6$ .............................................. C10G 45/60
[52] U.S. Cl. .................................. 208/217; 208/216 R; 208/136; 208/137
[58] Field of Search ............ 208/137, 216 R, 216 PD, 208/217, 136, 139

[56] References Cited

U.S. PATENT DOCUMENTS

| | | | |
|---|---|---|---|
| 4,045,505 | 8/1977 | Ireland et al. | 208/137 |
| 4,696,732 | 9/1987 | Angevine et al. | 208/111 |
| 4,827,076 | 5/1989 | Kokayeff et al. | 208/212 |
| 5,043,501 | 8/1991 | Del Rossi et al. | 585/323 |
| 5,059,304 | 10/1991 | Field | 208/99 |

*Primary Examiner*—Helane Myers
*Attorney, Agent, or Firm*—Alexander J. McKillop; Dennis P. Santini; Laurence P. Hobbes

[57] ABSTRACT

A process for producing a desulfurized gasoline boiling range product of relatively high octane number from a sulfur containing feed boiling in the naphtha boiling range by converting the feed in a single stage over a catalyst which comprises a) a substantially acidic porous refractory solid having an intermediate effective pore size and the topology of a zeolitic behaving material, which, in the aluminosilicate form, has a Constraint Index of about 1 to 12, e.g., MCM-22, b) a Group VI metal, e.g., Mo, c) a Group VIII metal, e.g., Co, and d) a suitable refractory support, e.g., Al$_2$O$_3$, under hydrotreating conditions to produce a product comprising a normally liquid fraction boiling in substantially the same boiling range as the feed, but which has a lower sulfur content than the feed and which has an octane number substantially no less than the feed.

17 Claims, 2 Drawing Sheets

HYDROCARBON UPGRADING PROCESS

CROSS-REFERENCE TO RELATED APPLICATIONS

This case is a continuation-in-part of U.S. Ser. No. 07/794,273, filed Nov. 19, 1991 now abandoned, the entire contents of which are incorporated herein by reference.

BACKGROUND OF THE INVENTION

This invention is directed to a process for the upgrading of hydrocarbon streams. It more particularly refers to a process for upgrading gasoline boiling range petroleum fractions containing substantial proportions of sulfur impurities, e.g., at least 100 ppm S by weight.

It is well known in the petroleum refining arts to catalytically crack heavy petroleum fractions, such as vacuum gas oil, or even in some cases atmospheric resid, in order to convert a substantial proportion thereof to a wide range of petroleum fractions. It is conventional to recover the product of catalytic cracking and to distill, and thereby resolve, this product into various fractions such as light gases; naphtha, including light and heavy gasoline; distillate fractions, such as heating oil and Diesel fuel; lube oil base fractions; and heavier fractions.

Where the petroleum fraction being catalytically cracked contains sulfur, the products of catalytic cracking will also likely contain sulfur impurities. In particular, it is well known that the heavy gasoline fraction is one portion of the product in which sulfur impurities seem to concentrate.

Therefore, it has been well known in the petroleum arts to subject this fraction to desulfurization processes. One such conventional, commercially known process is desulfurization by hydrotreating.

In one general type of conventional, commercial operation, the heavy gasoline is contacted with a suitable hydrotreating catalyst at elevated temperature and somewhat elevated pressure in the presence of a hydrogen atmosphere. One suitable family of catalysts which has been widely used for this service is a combination of a Group VIII and a Group VI element, such as cobalt and molybdenum, on a suitable substrate, such as, for example, alumina.

Partridge et al. U.S. Pat. No. 5,041,208 discloses the direct reforming and desulfurization of olefinic gasolines derived from catalytic cracking processes to provide a product of higher octane rating, using a large pore zeolite catalyst, e.g., zeolite Beta, which comprises noble metal.

Absil et al. U.S. Pat. No. 5,013,422 discloses catalytic hydrocracking over a NiW/MCM-22/Al$_2$O$_3$ catalyst.

Ware et al. U.S. Pat. No. 5,011,593 discloses hydrodesulfurization of light cycle oils with a CoMo/zeolite Beta/Al$_2$O$_3$ catalyst for distillate fuel preparation.

Kukes et al. U.S. Pat. No. 4,959,140 discloses a two-catalyst hydrocracking process wherein distillates are contacted with a NiW/zeolite/Al$_2$O$_3$ catalyst followed by contact with a CoMo/zeolite/Al$_2$O$_3$ catalyst. Among the zeolites suited for use therein are ZSM-5, ZSM-11, ZSM-12, ZSM-23, and ZSM-35.

Hamner et al. U.S. Pat. No. 3,625,880 discloses the conversion of heavy catalytic naphtha over a CoMo/zeolite catalyst to provide a product of increased octane number. The zeolite employed is described as having a 4 to 6 Angstrom pore size, e.g., erionite.

It is also well known that naphthas, often light or full range naphthas, are catalytically reformed so as to increase their octane numbers by converting at least a portion thereof to aromatics. Fractions to be fed to catalytic reforming, such as over a platinum type catalyst, for the purpose of upgrading their octane number, must also be desulfurized before reforming because the reforming catalyst is generally not sulfur tolerant. Thus, naphthas are usually pretreated to reduce their sulfur content before reforming.

Aromatics are generally the source of very high octane numbers, particularly very high research octane numbers. Therefore, while, on the one hand, they are quite desirable components of the gasoline pool, on the other hand, aromatics, and particularly benzene, have been the subject of severe limitations as a gasoline component because of their adverse effect upon the environment.

To the extent that it is possible, it has become desirable to create a gasoline pool in which the higher octanes are contributed by olefinic and branched chain paraffinic components, rather than aromatic components. Light and full range naphthas can contribute substantial volume to the gasoline pool, but, without reforming, they do not have substantial octane to contribute.

In the hydrotreating of petroleum fractions, particularly naphthas, and most particularly heavy cracked gasoline, the molecules containing the sulfur atoms are mildly hydrocracked so as to release their sulfur, usually as hydrogen sulfide. After the hydrotreating operation is complete, the product may be fractionated, or even just flashed, to release the hydrogen sulfide and collect the now sweetened gasoline.

This is an excellent process that has been practiced on gasolines and heavier petroleum fractions for many years. It works well and produces a satisfactory product. However, it does have disadvantages.

Cracked naphtha, as it comes from the catalytic cracker and without any further treatments, such as purifying operations, has a relatively high octane number. It also has an excellent volumetric yield. As such, cracked gasoline is an excellent contributor to the gasoline pool. It contributes a large quantity of product at a high blending octane number. In some cases, this fraction may contribute as much as up to half the gasoline in the refinery pool. Therefore, it is a desirable component of the gasoline pool.

A substantial portion of the octane of cracked naphtha is due to the olefin content of the naphtha. Catalytic cracking is particularly adept at producing olefinic products which, in the gasoline boiling range, have very high octanes.

Other highly unsaturated fractions boiling in the gasoline boiling range, which are produced in some refineries or petrochemical plants, include pyrolysis gasoline. This is a fraction which is often produced as a by-product in the cracking of petroleum fractions to produce light unsaturates, such as ethylene and propylene. Pyrolysis gasoline has a very high octane number but is quite unstable because, in addition to the desirable olefins boiling in the gasoline boiling range, this fraction contains a substantial proportion of unstable diolefins.

Hydrotreating of any of the sulfur containing fractions which boil in the gasoline boiling range causes a reduction in the olefin content thereof, and therefore a reduction in the octane number. While hydrotreating reacts hydrogen with the sulfur-containing molecules in order to convert the sulfur to hydrogen sulfide and to remove it, as with any operation which reacts hydrogen with a petroleum fraction, the hydrogen does not only react with the sulfur as desired. Unfortunately, the hydrogen also tends to saturate at least some of the higher octane olefins and other unsaturates in the fraction being hydrotreated. Some of the hydrogen may also cause hydrocracking as well as olefin saturation, depending on the conditions of the hydrotreating operation.

In any case, regardless of the mechanism by which it happens, hydrotreating not only removes harmful sulfur from the fraction being treated, but also lowers the octane number of that fraction. Further, as the degree of desulfurization increases, the octane number of the normally liquid gasoline boiling range product decreases. Therefore, in these days of relatively shorter supply of hydrocarbons, particularly sweet hydrocarbons, in view of the growing need to produce gasoline fuels with higher octane number, and because of current ecological considerations, promoting cleaner burning fuels, there is a conflict between producing more and higher octane gasoline on the one hand, and producing gasoline having a lower sulfur content, which is therefore cleaner burning and less polluting to the atmosphere, on the other.

In a completely different area of petroleum refining, it is known, and it has been known for some time, that various acid acting zeolitic materials have great value in upgrading petroleum fractions. For example, commercially practiced catalytic cracking is substantially always carried out using a catalyst which comprises an acid acting zeolitic behaving refractory material as at least one of its components.

It is also well known, and widely practiced commercially, to catalytically upgrade distillate and lube oil base fractions of petroleum in order to remove waxy components therefrom and thus reduce their pour point, that is the lowest temperature at which they will still pour. This type of operation is often carried out with the aid of a dewaxing catalyst, which usually comprises as at least one of its important, active components, an intermediate pore sized zeolitic acting acidic refractory material.

The dewaxing of distillate and/or lube fractions is usually accomplished at elevated temperatures and somewhat elevated pressures, and usually in the presence of hydrogen. The usual intent is for the pressure under which the reaction is carried out, and the amount of hydrogen in the reaction zone, to be controlled such that the hydrogen acts predominantly to keep the coke make on the catalyst down, and not such that substantial hydrocracking is supported.

Actually, except for, in some cases, the amount of hydrogen and the reaction pressure, the operating conditions for processes of dewaxing of distillate and lube fractions are often quite similar to the operating conditions of a process for hydrodesulfurization by hydrotreating. The catalyst, however, is quite different.

The purpose of a hydrotreating process is to convert the molecules containing the undesirable sulfur impurities so as to release the sulfur from the molecules as hydrogen sulfide. The purpose of a dewaxing process is to mildly and selectively crack the longer chain paraffinic and near paraffinic molecules in higher boiling distillate or lube base fractions which are primarily responsible for the unacceptably high pour point of the fraction. This mild selective cracking converts these undesirable long chain paraffinic molecules to lower boiling materials which are easily separated from the remaining distillate fraction, that now has a lower pour point. Suitably, dewaxing catalysts are acid acting zeolitic behaving materials which have restricted pore dimensions which will allow the ingress and egress of only selected size and shape molecules into their pore system. Since most, if not all, of the acid activity of these catalysts exists within their pore system, by limiting the access of feed molecules to these acidic cracking sites, only selected molecules of the feed are cracked.

A good dewaxing process will convert a minimum of the feed to lower boiling products. The intention and desire is to produce a product which has the highest possible yield in the distillate or lube oil boiling ranges, that is the boiling range of the feed material, while selectively removing as few as possible of those molecules which cause the pour point of the distillate or lube feed material to be higher than desired.

The operating conditions for dewaxing processes are usually selected so as to convert a minimum of the feed, consistent with the desired properties of the product. Further, since this operation is carried out under hydrogen pressure, and since at least some of the cracked product falls into the naphtha boiling range, the operating conditions are selected so as to accomplish as little olefin saturation as possible, again, consistent with the overall objective of lowering the pour point of the feed.

Suitable intermediate pore size zeolitic behaving catalytic materials are exemplified by those acid acting materials having the topology of intermediate pore size aluminosilicate zeolites. These similarly behaving zeolitic catalytic materials are exemplified by those which, in their acid form, have a Constraint Index between about 1 and 12. Reference is here made to U.S. Pat. No. 4,784,745 for a definition of Constraint Index and a description of how this value is measured. This patent also discloses a substantial number of porotectosilicate materials having the appropriate topology and the pore system structure to be useful in this service. The entirety of this patent is incorporated herein by reference.

It should be understood that these materials are particularly exemplary of the topology and pore structure of desired acid acting refractory solids. It is not intended that this patent be referred to as limiting the type of catalysts to be used for this service to aluminosilicates. Other compositions of refractory solid materials which have the desired acid activity, pore structure and topology are similarly well suited.

OBJECTS AND BROAD STATEMENT OF THIS INVENTION

An important object of this invention is therefore to provide a novel process for the treatment of sulfur containing gasoline boiling range fractions by which the sulfur content thereof is reduced to acceptable levels and the octane number thereof is not substantially reduced.

It is a further object of this invention to provide a novel process for the treatment of sulfur containing gasoline boiling range fractions by which the sulfur content thereof is reduced to acceptable levels, the research octane number (RON) thereof is not substantially reduced, and the volumetric yield of gasoline boiling range product is actually increased.

It is a still further object of this invention to provide a novel process for the treatment of sulfur containing heavy, cracked gasoline boiling range fractions by which the sulfur content thereof is reduced to acceptable levels, the research octane number (RON) thereof is not substantially reduced, or may in some cases actually be increased, and the volumetric yield of gasoline boiling range product is actually increased.

It is a still further object of this invention to provide a process of upgrading the research octane number (RON) of light and full range naphtha fractions without the necessity of reforming such fraction, or at least, without the necessity of reforming such fractions to the degree previously thought necessary.

Other and additional objects of this invention will become apparent from a consideration of this entire specification and the claims appended hereto.

In accord with and fulfilling these objects, one important aspect of this invention is a process in which a sulfur containing gasoline boiling range fraction containing at least 100 ppm S, preferably at least 1000 ppm S, even more preferably at least 10,000 ppm S by weight, say about 10,000 to 30,000 ppm S by weight, is hydrotreated under conditions sufficient to separate at least a substantial proportion of the bound sulfur therefrom without reducing the research octane number (RON), in the presence of an acidic acting, zeolitic behaving, refractory material of intermediate pore size which, if it was in an aluminosilicate form, would have a Constraint Index of about 1 to 12, under conditions which may be substantially those associated with the dewaxing of distillate or lube oil fractions, and/or may be those which are substantially the same as the conditions of hydrotreating. It is to be noted that, although it is stated that the conditions for the conversion of the desulfurized intermediate product by contact with the intermediate pore size refractory solid are those often associated with the dewaxing of distillate or lube oil fractions, this is only for the purposes of defining the operating conditions. It does not define the fractions being operated on, or the operation which is performed on that fraction, or the product produced thereby.

Therefore, according to this invention, a sulfur-containing gasoline boiling range fraction, suitably a light naphtha having a boiling range of about $C_5$ to 330° F., a full range naphtha having a boiling range of about $C_5$ to 420° F., a heavier naphtha fraction boiling in the range of about 260° F. to 412° F., or a heavy gasoline fraction boiling at, or at least within, the range of about 330° to 500° F., preferably about 330° to 412° F. are well suited to use as the feed to the process of this invention. While the most preferred feed appears at this time to be a heavy gasoline which has resulted from the catalytic cracking of a still heavier feed, such as a gas oil; or a light or full range gasoline boiling range fraction, this may change as the case may be and the need arises in the future. In any case, the suitably selected sulfur containing, gasoline boiling range feed is treated by:

converting such gasoline boiling range feed by effective contact thereof with a hydrotreating catalyst, which comprises a substantially acidic porous refractory solid having an intermediate effective pore size and the topology of a zeolitic behaving material, which, in the aluminosilicate form, has a Constraint Index of about 1 to 12, a Group VI metal, a Group VIII metal, and a suitable refractory support, such as for example an acidic support like alumina, under conventional hydrotreating conditions which are sufficient to separate at least some of the sulfur from the feed molecules and convert such to hydrogen sulfide, to produce a product comprising a normally liquid fraction boiling in substantially the same boiling range as the feed, which is a gasoline boiling range, but which has a lower sulfur content than the feed and which has a research octane number (RON) substantially no less than the feed; and recovering at least the gasoline boiling range fractions so produced.

PREFERRED ASPECTS OF THIS INVENTION

In practicing this invention, the suitable temperature of the conversion can be at least 650° F., preferably about 650° to 900° F., more preferably about 700° to 800° F.; the pressure is about 50 to 1500 psig, preferably about 300 to 1000 psig, more preferably 550 to 1000 psig; the space velocity is about 0.5 to 10 LHSV, preferably about 1 to 6 LHSV; and the hydrogen to hydrocarbon ratio in the feed is about 100 to 20,000 SCF/B, preferably about 500 to 5,000 SCF/B. The catalyst has been stated to be a desulfurization/octane improvement catalyst comprising: a) an acid acting porous refractory solid having an intermediate effective pore size and the topology of a zeolitic behaving material, which, in the aluminosilicate form, has a Constraint Index of about 1 to 12, b) a Group VI metal, c) a Group VIII metal and d) a suitable binder or substrate. The Group VI metal is usually molybdenum or tungsten. The Group VIII metal is usually nickel or cobalt. However, other metals which have been known to be useful in this service are also included. The molar ratio of Group VIII to Group VI metal is generally no greater than 2, preferably no greater than 1.

The zeolitic material portion of this catalyst suitably has the topology of ZSM-5, ZSM-11, ZSM-22, ZSM-23, ZSM-35, ZSM-48, ZSM-50, MCM-22, mordenite, or other similarly structured materials. MCM-22 is particularly preferred.

ZSM-5 is described in U.S. Pat. No. 3,702,886, U.S. Pat. No. Re. 29,948 and in U.S. Pat. No. 4,061,724 (describing a high silica ZSM-5 as "silicalite").

ZSM-11 is described in U.S. Pat. No. 3,709,979.
ZSM-22 is described in U.S. Pat. No. 4,556,477.
ZSM-23 is described in U.S. Pat. No. 4,076,842.
ZSM-35 is described in U.S. Pat. No. 4,016,245.
ZSM-48 is described in U.S. Pat. No. 4,397,827.
ZSM-50 is described in U.S. Pat. No. 4,640,829.
MCM-22 is described in U.S. Pat. No. 5,013,422.

These patents are incorporated herein by reference.

The binder or substrate is suitably any refractory binder material. Examples of these materials are well known in the petroleum arts and include silica, silica-alumina, silica-zirconia, silica-titania, alumina, titanium dioxide, zirconium dioxide, clays, etc. Alumina is particularly preferred.

Although the zeolitic behaving material has been defined by relation to a group of porous refractory materials which are usually known in their aluminum-silicon-oxygen composition form, this is by no means limiting on the scope of this invention. These designations have been used to define the topology only, and not to restrict the composition, of the zeolitic behaving refractory solid catalyst components. The catalyst composition is, however, restricted to those comprising zeolitic behaving materials of the defined structures which have sufficient acid activity to have cracking activity to convert at least a desired fraction of the feed.

One measure of the acid activity of a catalyst is its Alpha Value which is an approximate indication of the catalytic cracking activity of the catalyst compared to a standard catalyst and it gives the relative rate constant (rate of normal hexane conversion per volume of catalyst per unit time). It is based on the activity of a high-activity silica-alumina cracking catalyst taken as an Alpha of 1 (Rate Constant=0.016 sec$^{-1}$). The Alpha Test is described in U.S. Pat. No. 3,354,078; in the *Journal of Catalysis*, vol. 4, p. 527 (1965); vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395 (1980). The catalyst of this invention should suitably have an alpha activity of at least about 20, preferably at least about 50 to 200. It is inappropriate for the catalyst to have too high an acid activity because it is desirable to only crack and rearrange so much of the feed as is necessary to restore lost octane without severely reducing the volume of the gasoline boiling range product.

The particle size and the nature of the catalyst will usually be determined by the type of conversion process which is being carried out, such as: a down-flow, liquid phase, fixed bed process; an up-flow, fixed bed, liquid phase process; an ebulating, fixed fluidized bed liquid or gas phase process; or a liquid or gas phase, transport, fluidized bed process. As noted above, all of these different process schemes are, per se, well known in the petroleum arts, and the choice of the particular mode of operation is a matter left to the discretion of the operator.

It is well within the practice of this invention to carry out the single stage conversion envisioned followed by separating the product into the usual fractions according to their boiling ranges and uses. The predominant fractions are: dry gas; LPG, that is $C_3$ and $C_4$ gases; and both heavy and light gasoline.

It is further within the scope of this invention to separate the low sulfur, gasoline boiling range fraction produced from the hydrogen sulfide and/or ammonia by-products produced in the hydrodesulfurization operation prior to further processing. These undesirable components, notably hydrogen sulfide and ammonia, are separated for further processing as is usual in petroleum refining. Hydrogen sulfide can be converted to elemental sulfur via Claus process. $NH_3$ can be recovered for fertilizer applications.

The present invention is particularly useful in that it carries out hydrodesulfurization without significantly reducing (even increasing, in some cases) the research octane number (RON) of the desulfurized product in a single stage, over a single catalyst. There is no need to remove substantially all sulfur and nitrogen from the reaction system before effecting octane-restoration (or octane increase) treatment.

It is important that the conditions of operation and the catalysts which are chosen for use in this invention combine to produce a product slate in which the gasoline product octane is not substantially lower than the octane of the feed gasoline boiling range material; that is not lower by more than about 1 to 3 octane numbers. It is preferred that the catalysts and the operating conditions which are chosen for use in this invention are such that the volumetric yield of the product is not substantially diminished as compared to the feed. In some cases, the volumetric yield and/or octane of the gasoline boiling range product may well be higher than those of the feed. In many cases, the octane barrels (that is the research octane number (RON) of the product times the volume of product) of the product will be higher than the octane barrels of the feed.

It has been found that the research octane number (RON) of the product can be enhanced by operating at increased temperatures, say, greater than 650° F., preferably greater than 750° F.

The process of this invention is preferably operated under a combination of conditions such that the desulfurization should be at least about 50%, preferably at least about 75%, as compared to the sulfur content of the feed.

SPECIFIC EXAMPLES OF THE PRACTICE OF THIS INVENTION

The following examples are illustrative of the practice of this invention but are by no means restrictive in the scope thereof. In these examples, parts and percentages are by weight unless they are expressly stated to be on some other basis. Temperatures are in °F. and pressures in psig, unless expressly stated to be on some other basis.

In the following examples, unless it is indicated that there was some other feed, the same heavy cracked naphtha, containing 2% sulfur, was subjected to processing as set forth below under conditions required to allow a maximum of only 300 ppmw sulfur in the final gasoline boiling range product. In the following Table 1 there are set forth the properties of the CoMo/MCM-22/$Al_2O_3$ catalyst used in the present invention and a conventional, commercially available CoMo/$Al_2O_3$ hydrofinishing catalyst.

TABLE 1

| Chemical Composition, wt % | Catalyst Properties | |
|---|---|---|
| | CoMo/MCM-22/$Al_2O_3$[1] | CoMo/$Al_2O_3$ |
| Co | 2.0 | 3.4 |
| Mo | 9.8 | 10.2 |
| Physical Properties | | |
| Particle Density, g/cc | 0.919 | — |
| Surface Area, m$^2$/g | 338 | 260 |
| Pore Volume, cc/g | 0.716 | 0.55 |
| Pore Diameter, A | 85 | 85 |

[1]contains 65 wt % MCM-22 and 35 wt % alumina

In Table 2 below, there is set forth the properties of the highly aromatic heavy cracked naphtha feed which was used in these examples:

TABLE 2

| Heavy FCC Naphtha | |
|---|---|
| Gravity, °API | 23.5 |
| Hydrogen, wt % | 10.23 |
| Sulfur, wt % | 2.0 |
| Nitrogen, ppmw | 190 |
| Clear Research Octane, R + O | 95.6 |
| Composition, wt % | |
| Paraffins | 12.9 |
| Cyclo Paraffins | 8.1 |
| Olefins and Diolefins | 5.8 |
| Aromatics | 73.2 |
| Distillation, °F. | |
| 5% | 289 |
| 10% | 355 |
| 30% | 405 |
| 50% | 435 |
| 70% | 455 |
| 90% | 482 |
| 95% | 488 |

EXAMPLE 1

Figure 1:
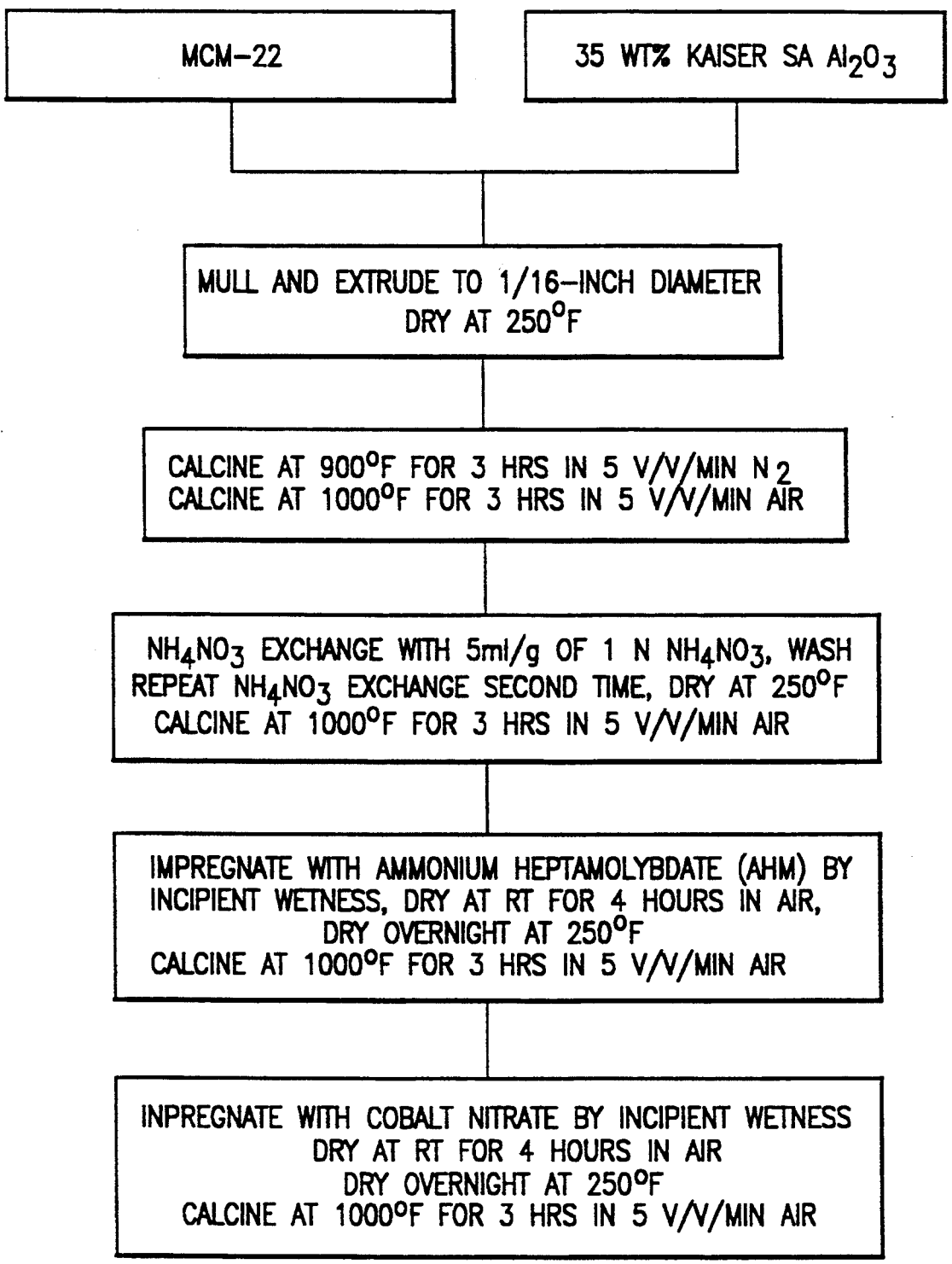
FIG. 1 is a flow sheet depicting the preparation of a catalyst composition (CoMo on 65% MCM-22/35% $Al_2O_3$) employed in the present invention.

CoMo/MCM-22/Al$_2$O$_3$ catalyst was prepared as set out in the flow chart in FIG. 1. A conventional, commercially available CoMo/Al$_2$O$_3$ hydrofinishing catalyst was prepared by impregnation of an alumina support.

The finished CoMo/MCM-22/Al$_2$O$_3$ catalyst had a lower metal loading than the CoMo/Al$_2$O$_3$ catalyst. Both catalysts were presulfided and evaluated at the same conditions (1.0 LHSV and 600 psig H$_2$) except for the hydrogen circulation rate, 1000 scf/b vs. 3200 scf/b). Generally, higher hydrogen circulation rates and higher metal loadings provide better desulfurization activity. Reactor temperature was changed to obtain different operating severities.

Figure 2:
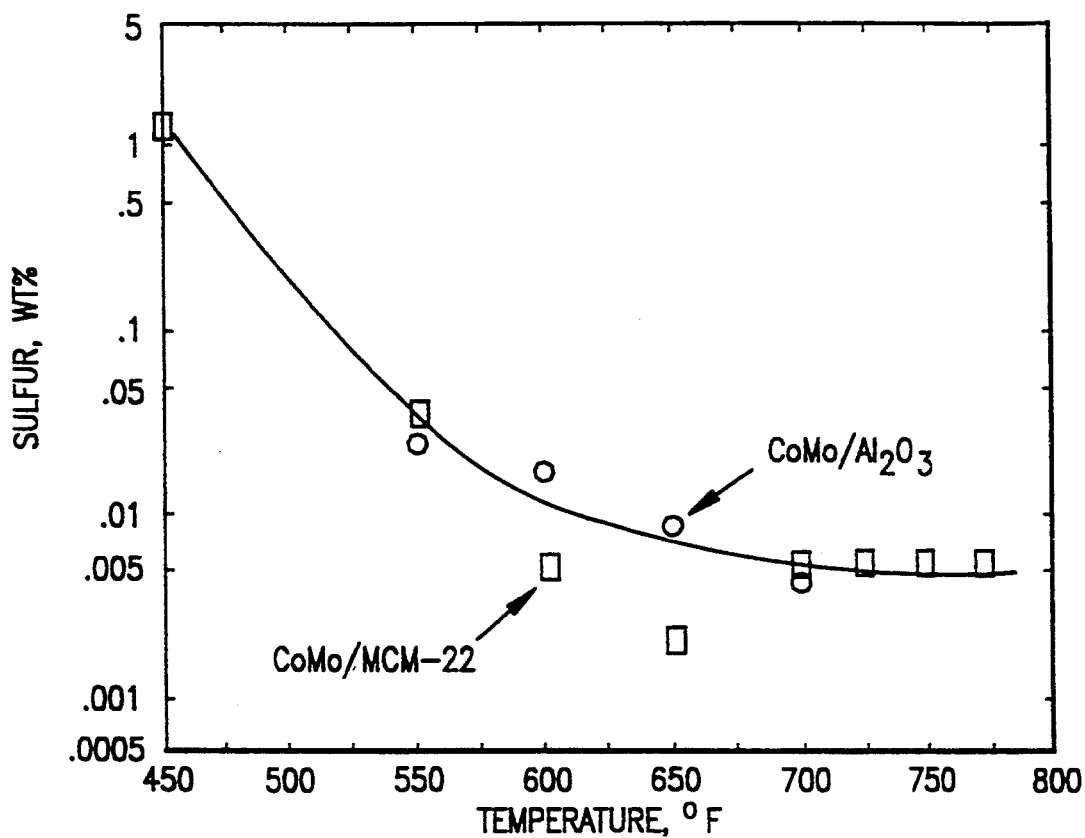
FIG. 2 is a plot of gasoline sulfur content as a function of operating temperature for the catalyst of the present invention and a conventional, commercially available CoMo/$Al_2O_3$ catalyst.
Figure 3:
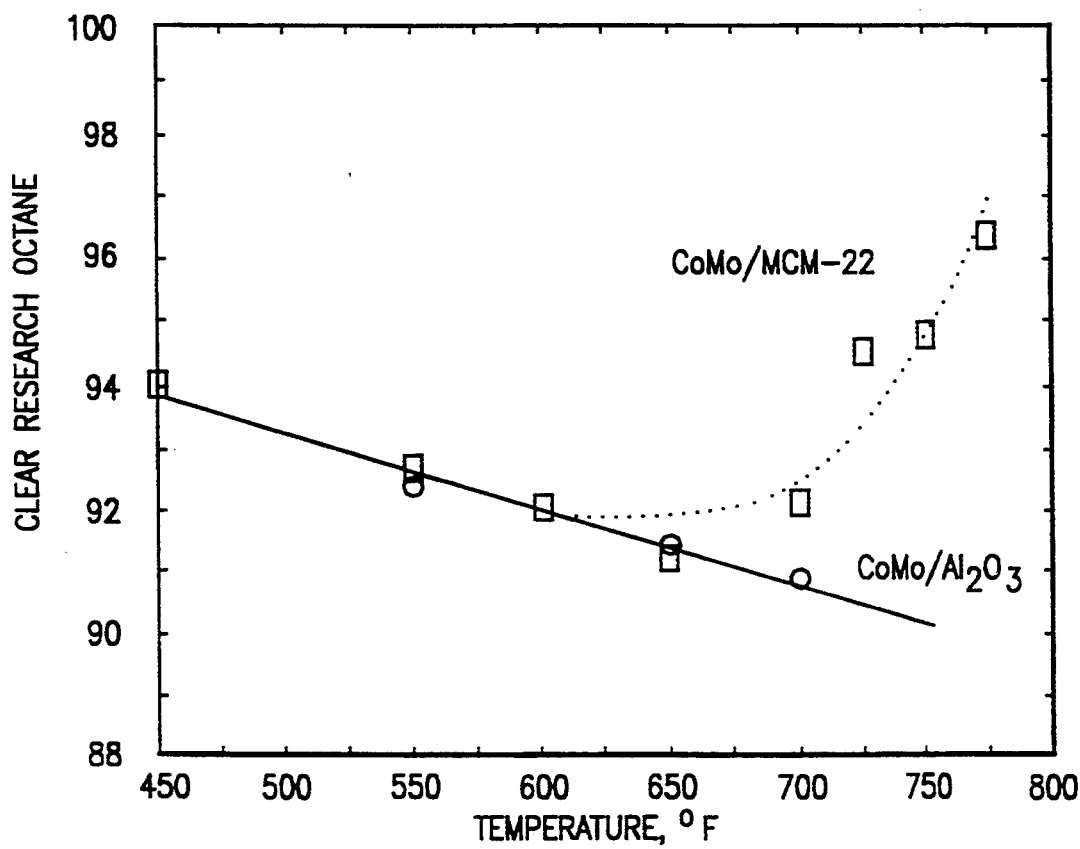
FIG. 3 is a plot of Clear Research Octane as a function of operating temperature for the catalyst of the present invention and a conventional CoMo/$Al_2O_3$ catalyst.

The results show that the CoMo/MCM-22/Al$_2$O$_3$ catalyst, having lower metal loading and evaluated at lower hydrogen circulation rate, was at least as active as the CoMo/Al$_2$O$_3$ catalyst for desulfurization as shown in FIG. 2. More importantly, at high temperatures, e.g., above 650° F., the octane of the desulfurized gasoline was higher than that of the conventional CoMo/Al$_2$O$_3$ catalyst. Above a reactor temperature of 750° F., the CoMo MCM-22/Al$_2$O$_3$ catalyst produced a low-sulfur gasoline with increased research octane number (RON) (see FIG. 3), as compared to the 95.6 Research Clear Octane Number of the raw FCC heavy gasoline. At the same temperatures, the octane loss for the conventional CoMo/Al$_2$O$_3$ catalyst was more than 4 octane numbers (RON).

What is claimed is:

1. A process of upgrading a sulfur and olefin containing feed fraction containing at least 100 ppm S, and boiling in the gasoline boiling range which comprises:
    contacting such sulfur and olefin containing gasoline boiling range feed fraction with a hydrotreating catalyst at temperatures of at least about 650° F., which comprises a) a substantially acidic porous refractory solid having an intermediate effective pore size and the topology of a zeolitic behaving material corresponding to at least one member of the group consisting of ZSM-5, ZSM-11, ZSM-22, ZSM-23, ZSM-35, ZSM-50, MCM-22, and mordenite, b) a Group VI metal, c) a Group VIII metal, and d) a suitable refractory support, under hydrotreating conditions comprising a temperature of about 650° to 900° F., a pressure of about 50 to 1500 psig, a space velocity of about 50 to 1500 psig, a space velocity of about 0.5 to 10 LHSV, and a hydrogen to hydrocarbon ratio of about 500 to 5000 standard cubic feet of hydrogen per barrel of feed, which are sufficient to separate at least some of the sulfur from the feed molecules and convert such to hydrogen sulfide, to produce a product comprising a normally liquid fraction boiling in substantially the same boiling range as the feed, but which has a lower sulfur content than the feed and which has a research octane number (RON) substantially no less than the feed; and
    recovering at least the gasoline boiling range fractions so produced.

2. The process as claimed in claim 1 wherein said feed fraction comprises a light naphtha fraction having a boiling range within the range of C$_5$ to 330° F.

3. The process as claimed in claim 1 wherein said feed fraction comprises a full range naphtha fraction having a boiling range within the range of C$_5$ to 420° F.

4. The process as claimed in claim 1 wherein said feed fraction comprises a heavy naphtha fraction having a boiling range within the range of 330° to 500° F.

5. The process as claimed in claim 1 wherein said feed fraction comprises a heavy naphtha fraction having a boiling range within the range of 330° to 412° F.

6. The process as claimed in claim 1 wherein said feed is a cracked naphtha fraction comprising olefins.

7. The process as claimed in claim 1 wherein said feed contains at least 1000 ppm S.

8. The process as claimed in claim 7 wherein said feed contains at least 10,000 ppm S by weight, and said catalyst comprises a substantially acidic porous refractory solid refractory material having a topology substantially corresponding to the topology of MCM-22.

9. The process as claimed in claim 1 wherein said refractory support is at least one member selected from the group consisting of silica, alumina, silica-alumina, silica-zirconia, silica-titania, titanium oxide, and zirconium oxide.

10. The process as claimed in claim 1 wherein said hydrotreating catalyst comprises cobalt, molybdenum and alumina.

11. The process as claimed in claim 8 wherein said hydrotreating catalyst comprises cobalt, molybdenum and alumina.

12. The process as claimed in claim 1 wherein said hydrotreating conditions comprise a temperature of about 700° to 800° F., a pressure of about 300 to 1000 psig, a space velocity of about 1 to 6 LHSV, and a hydrogen to hydrocarbon ratio of about 1000 to 2500 standard cubic feet of hydrogen per barrel of feed.

13. The process as claimed in claim 1 wherein said feed contains 10,000 to 30,000 ppm S by weight, said hydrotreating conditions comprise a temperature of about 650° to 900° F., and said product has a research octane number (RON) greater than the feed.

14. A process of upgrading a sulfur containing feed fraction containing at least 100 ppm S, boiling in the gasoline boiling range which comprises:
    contacting such sulfur containing gasoline boiling range feed fraction at a temperature of at least 650° F. with a hydrotreating catalyst., which comprises a) a substantially acidic porous refractory solid having an intermediate effective pore size and the topology of a zeolitic behaving material, corresponding to at least one member of the group consisting of ZSM-5, ZSM-11, ZSM-22, ZSM-23, ZSM-35, ZSM-50, MCM-22, add mordenite, b) a Group VI metal, c) a Group VIII metal, and d) a suitable refractory support, under hydrotreating conditions comprising a temperature of about 650° to 900° F., a pressure of about 50 to 1500 psig, a space velocity of about 50 to 1500 psig, a space velocity of about 0.5 to 10 LHSV, and a hydrogen to hydrocarbon ratio of about 500 to 5000 standard cubic feet of hydrogen per barrel of feed, which are sufficient to separate at least some of the sulfur from the feed molecules and convert such to hydrogen sulfide, to produce a product comprising a normally liquid fraction boiling in substantially the same boiling range as the feed, but which has a lower sulfur content than the feed and which has a research octane number (RON) substantially no less than the feed; and recovering at least the gasoline boiling range fractions so produced.

15. The process of claim 14 wherein said catalyst contains Group VIII and Group VI metals in a molar ratio of Group VIII to Group VI metal no greater than 2.

16. The process of claim 15 wherein said catalyst contains Group VIII and Group VI metals in a molar ratio of Group VIII to Group VI metal no greater than 1.

17. The process of claim 14 wherein said catalyst comprises MCM-22.

* * * * *

UNITED STATES PATENT AND TRADEMARK OFFICE
CERTIFICATE OF CORRECTION

PATENT NO. : 5,378,352
DATED : January 3, 1995
INVENTOR(S) : Thomas F. Degnan et al.

It is certified that error appears in the above-indentified patent and that said Letters Patent is hereby corrected as shown below:

Column 11, Line 1, "add" should read --and--.

Signed and Sealed this

Fourteenth Day of March, 1995

Attest:

BRUCE LEHMAN

*Attesting Officer*     *Commissioner of Patents and Trademarks*